United States Patent
Shekhel et al.

(10) Patent No.: US 6,204,457 B1
(45) Date of Patent: *Mar. 20, 2001

(54) ELECTROMAGNETIC INKING DIGITIZER PEN AND METHOD

(75) Inventors: Alexander B. Shekhel; Stephen R. Caldwell, both of Chandler, AZ (US)

(73) Assignee: Fine Point Innovations, Inc., Tempe, AZ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/879,556

(22) Filed: Jun. 20, 1997

(51) Int. Cl.[7] .................................................. G08C 21/00
(52) U.S. Cl. ................................ 178/19.01; 178/19.03; 178/19.04; 178/19.05
(58) Field of Search .................................... 345/173, 179, 345/180; 178/18.01, 18.03, 19.01, 19.03, 19.04, 19.05, 20.03

(56) References Cited

U.S. PATENT DOCUMENTS

| | | | |
|---|---|---|---|
| 4,646,351 | * | 2/1987 | Asbo et al. ........................ 178/20.03 |
| 4,786,765 | * | 11/1988 | Yamanami et al. ................ 178/19.06 |
| 5,247,137 | * | 9/1993 | Epperson ........................... 178/19.04 |
| 5,444,192 | * | 8/1995 | Shetye et al. ...................... 178/18.09 |
| 5,548,092 | * | 8/1996 | Shriver ................................. 345/180 |
| 5,818,431 | * | 10/1998 | Oh et al. .............................. 345/179 |
| 5,838,819 | * | 11/1998 | Ruedisueli et al. .................. 345/179 |
| 5,850,059 | * | 12/1998 | Yoshimura et al. ................. 345/179 |
| 5,866,856 | * | 2/1999 | Holtzman ............................ 345/179 |

* cited by examiner

*Primary Examiner*—Vijay Shankar
(74) *Attorney, Agent, or Firm*—Cahill, Sutton & Thomas P.L.C.

(57) ABSTRACT

A digitizer pen includes a barrel section, a nose section removably attached to the barrel section, and an ink cartridge disposed in the barrel section and having a writing tip protruding from an end of the nose section, a cylindrical ferrite core disposed in the nose section, a first portion of the ferrite core being rigidly attached to the nose section. A coil surrounding a second portion of the ferrite core is attached to the barrel section. A writing tip end of the ink cartridge extends through the ferrite core. The first portion of the ferrite core is separable from the coil, so that when the nose section is removed from the barrel section the first portion of the ferrite core is separated from the coil, leaving the coil attached in fixed relation to the barrel section and also leaving exposed a portion of the ink cartridge initially covered by the first portion of the ferrite core, whereby a user can easily grasp the exposed portion of the ink cartridge and remove it without the aid of a tool.

18 Claims, 3 Drawing Sheets

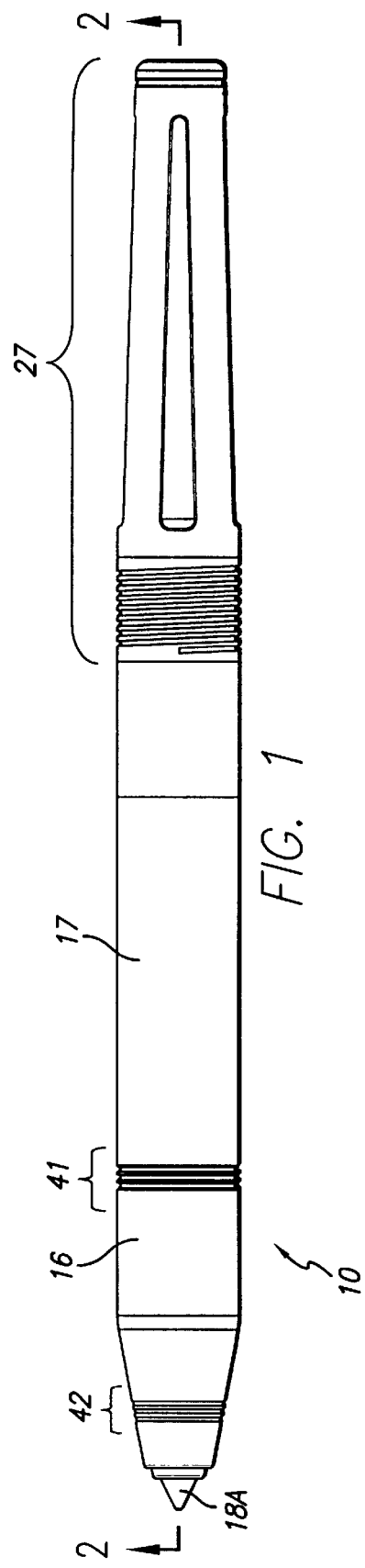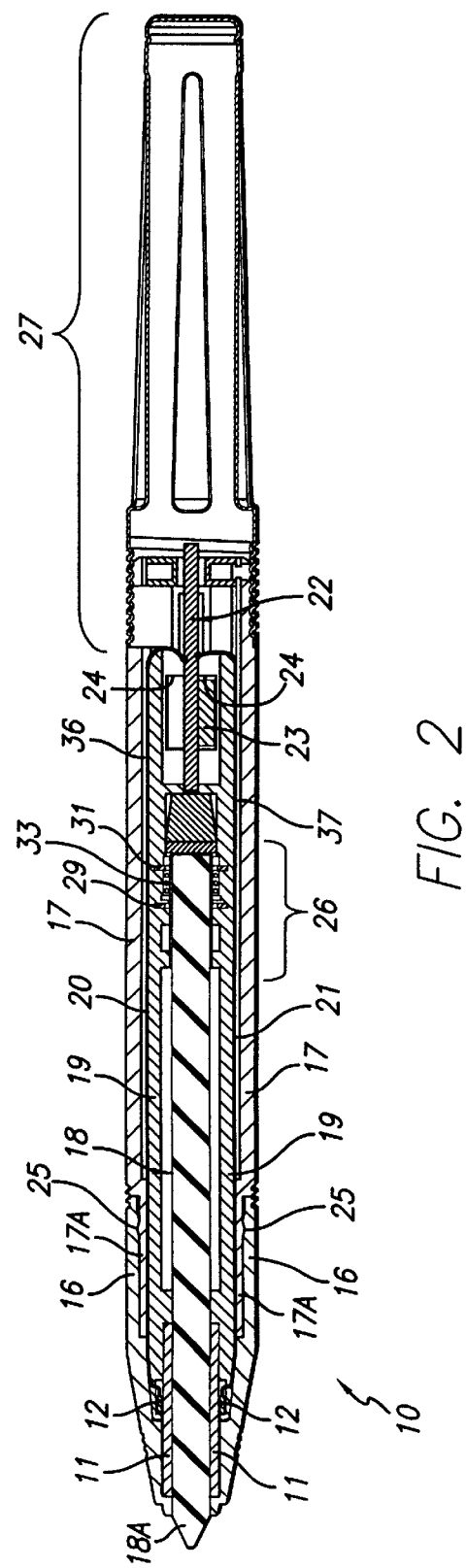

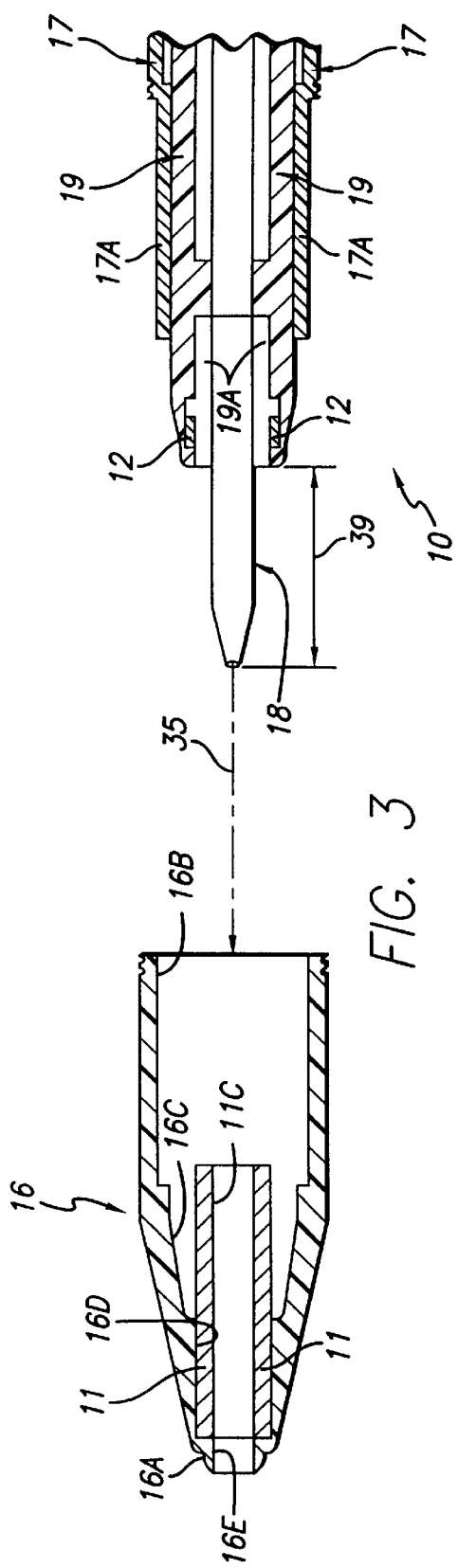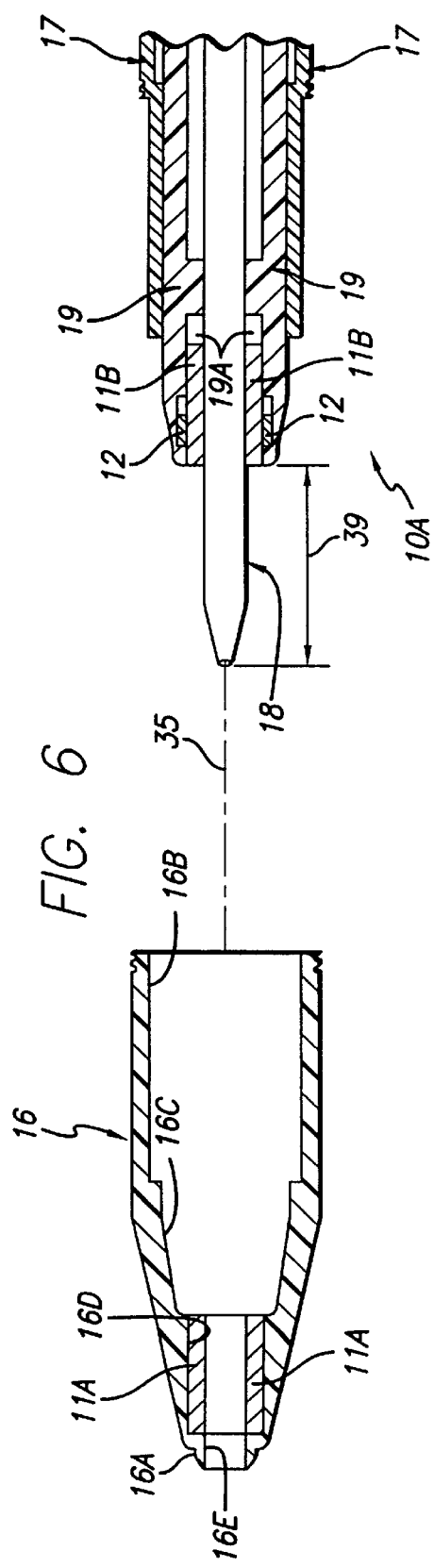

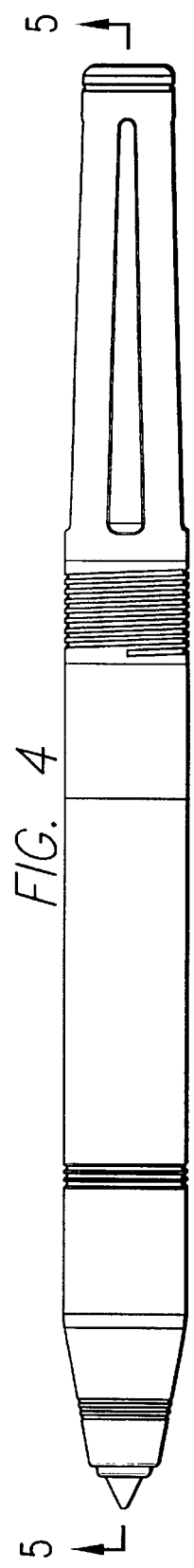
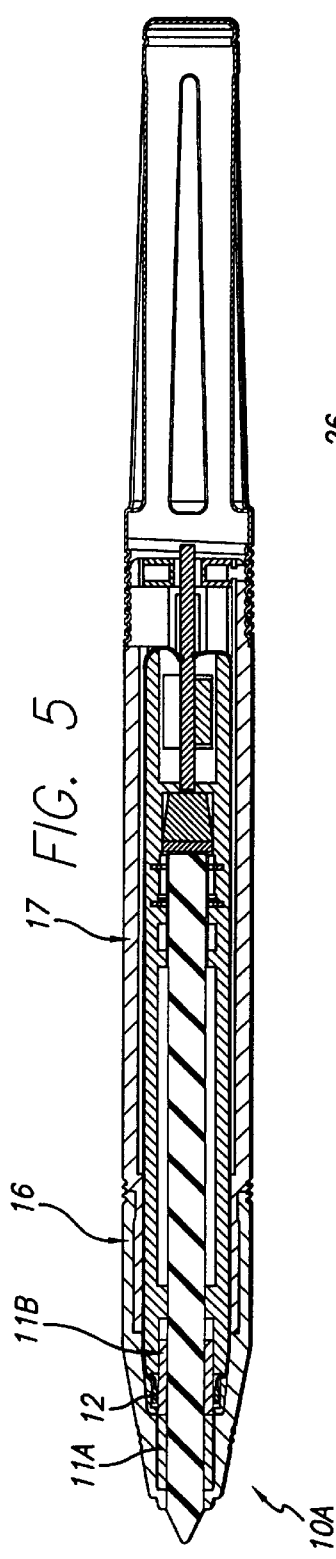
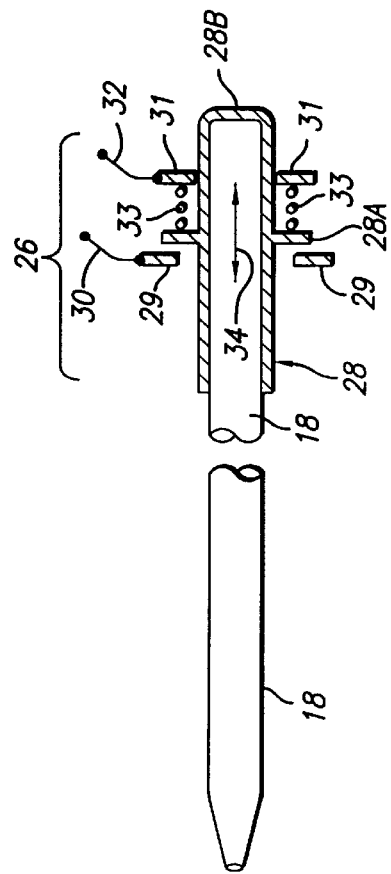
FIG. 4
FIG. 5
FIG. 7

ELECTROMAGNETIC INKING DIGITIZER PEN AND METHOD

BACKGROUND OF THE INVENTION

Various electronic "digitizer pens" are used in conjunction with electronic digitizers, digitizer tablets, or the like. Such digitizer pens include replaceable ink cartridges used both for writing and mechanical activation of an internal "pen switch" when the tip of the replaceable ink cartridge is pressed against a digitizing surface of the digitizer pad or tablet to control the electronic operation of the digitizer pen in the digitizing process. (Although inking capability is not needed for digitizing of information that already is imprinted on a sheet of paper, use of an ink cartridge in a digitizer pen allows information to be digitized as it is being written on a sheet of paper placed on the digitizing surface.) Many of the prior digitizer pens are cordless and therefore battery powered. This necessitates efficient use of power to prolong battery life. In order to obtain an optimum transfer of the "pen signal" from a "pen coil" into the receiving grid conductors of a digitizer tablet, the highest possible signal strength must be achieved with the minimum dissipation of power. This necessitates use of an annular, cylindrical ferrite core around which the pen coil is wound and through which the writing tip of the ink cartridge extends.

A problem with prior electronic pens is that it is difficult to replace spent ink cartridges because a fixed ferrite core of the pen coil is positioned coaxially about the writing tip end of the ink cartridge so that only a very small portion of the writing end of the cartridge is ever exposed beyond the end of the ferrite core. This makes it very difficult for the user to grasp a spent ink cartridge sufficiently securely to remove it so it can be replaced with a new one.

While "standard" and non-standard ink cartridges have been used in various prior digitizer pens, for example as disclosed in U.S. Pat. Nos. 4,532,376, 4,638,119 and 4,227,044, which utilize pen coils, none of these references disclose a more modern digitizer pen structure in which the writing end of an ink cartridge extends through a fixed ferrite core around which a pen coil is wound, and none of these prior digitizer pens present the above-described difficulty of removing a spent ink cartridge from the pen barrel. One prior approach to solving this problem has been to provide special ink cartridges for use in digitizer pens, wherein the tip can be somewhat more easily grasped is the case for standard ink cartridges. Another approach, for example in a digitizer pen made by WACOM of Japan, is to provide an ink cartridge removal tool which is especially adapted to remove non-standard ink cartridges of its own design.

However, it would be much less expensive and more convenient to provide a digitizer pen in which standard, inexpensive, widely available ink cartridges can be used and in which they can be easily removed and replaced without using a specialized tool, or even any tool at all.

SUMMARY OF THE INVENTION

Accordingly, it is an object of the invention to provide an improved digitizing pen structure and method in which an inking cartridge that extends through a ferrite core of a pen coil can be easily removed and replaced.

It is another object of the invention to provide an improved digitizer pen structure and method that avoids the need to use a tool to remove a spent inking cartridge that extends through a ferrite core of a pen coil.

It is another object of the invention to provide an improved digitizer pen structure that transmits a strong pen signal to grid conductors of a digitizer table, yet dissipates minimum power, and also is easily manufacturable.

It is another object of the invention to provide an improved cordless digitizer pen structure that transmits a strong pen signal to grid conductors of a digitizer table, yet dissipates minimum power and has long battery life.

Briefly described, and in accordance with one embodiment thereof, the invention provides a digitizer pen including a barrel section, a nose section adjacent to the barrel section, and an ink cartridge disposed in the barrel section and having a writing tip protruding from an end of the nose section, with a ferrite core disposed in the nose section, at least a portion of the ferrite core being permanently disposed in the nose section, a coil including a plurality of turns around the ferrite core, the ink cartridge extending through a hole in the ferrite core, at least the portion of the ferrite core being separable from the ink cartridge to expose a corresponding length of a writing end portion of the ink cartridge whereby a user can easily grasp the exposed portion of the ink cartridge and remove it without the aid of a tool.

In the described embodiments a cylindrical ferrite core is disposed in the nose section, a first portion of the cylindrical ferrite core being rigidly attached to the nose section. The coil is attached in fixed relation to the barrel section and includes a plurality of turns around a second portion of the cylindrical ferrite core. The ink cartridge extends through the first and second portions of the cylindrical ferrite core. The first portion of the cylindrical ferrite core is separable from the coil, so that when the nose section is removed from the barrel section the first portion of the cylindrical ferrite core is separated from the coil, leaving the coil attached in fixed relation to the barrel section and also leaving exposed a portion of the ink cartridge initially covered by the first portion of the cylindrical ferrite core.

In one embodiment the second portion of the cylindrical ferrite core is integral with the first portion thereof and also is separable from the coil. In another embodiment the first portion of the cylindrical ferrite core is separable from the second portion thereof, and the second portion of the cylindrical ferrite core is attached to the barrel section and remains in fixed relation to the coil when the nose section is removed from the barrel section.

BRIEF DESCRIPTION OF THE DRAWINGS

FIG. 1 is an elevation view of a first embodiment of the invention.

FIG. 2 is a section view along section line 2—2 of FIG. 1.

FIG. 3 is a partial exploded section view of the embodiment of FIGS. 1 and 2.

FIG. 4 is an elevation view of a second embodiment of the invention.

FIG. 5 is a section view along section line 5—5 of FIG. 4.

FIG. 6 is a partial exploded section view of the embodiments of FIGS. 4 and 5.

FIG. 7 is a diagram illustrating the operation of the pen switch shown in FIGS. 2 and 5.

DETAILED DESCRIPTION OF THE PREFERRED EMBODIMENTS

Referring to FIGS. 1–3, digitizing pen 10 includes a plastic barrel 17 (which may be composed of ABS plastic)

having a removable plastic nose section 16 from which the tip 18A of a "standard" ballpoint pen ink cartridge 18 extends. Section 16 snap fits onto barrel 17 by action of a detent feature 25 shown in the sectional view of FIG. 2. Circumferential ribs 41 and 42 of nose section 16 aid in gripping the pen. Ribs 41 also mask the boundary between nose section 16 and barrel 17. End section 27 is threaded onto barrel 17, and houses a AAAA battery that powers circuitry inside digitizing pen 10.

Inside digitizing pen 10, ink cartridge 18 extends through and is supported by a plastic support 19. The right end of ink cartridge 18 is removably engaged with switch assembly 26 so that ink cartridge 18 can be easily withdrawn by the fingers of a user, without the use of a tool. As subsequently explained with reference to FIG. 7, the switch 26 is opened when tip 18A of ink cartridge 18 is depressed against a digitizing surface.

A printed circuit board 22 having one or more integrated circuit chips 23 mounted thereon is powered by the above mentioned battery. The chip(s) 23 comprise circuitry similar to that described in commonly owned U.S. Pat. No. 5,225,637 entitled "Position Resolving System" by Rodgers et al., issued Jul. 6, 1993 and U.S. Pat. No. 5,218,637 entitled "Low Power Cordless Magnetic Field Digitizer With Differential Grid Sensing and Synchronous Position Demodulation" by Gray et al., issued Jun. 8, 1993, all of which are incorporated herein by reference. Such circuitry applies a pen signal through conductors 36 and 37 to the two terminals of a pen coil 12 which is wound about or disposed about a fixed annular, cylindrical ferrite core 11. The writing end portion of ink cartridge 18 extends through and slightly beyond core 11, which provides a strong transmitted signal to the grid conductors of the digitizing surface with minimum power dissipation. Both ferrite core 11 and pen coil 12 are disposed within a recess 16B,16C of removable nose section 16, when the nose and barrel are assembled as shown in the partially exploded view of FIG. 3. Ferrite core 11 is a single unitary core having a cylindrical opening 11C through which ink cartridge 18 extends, and is firmly affixed in cylindrical opening 16D of nose section 16.

Therefore, when nose section 16 is removed, as shown in FIG. 3, ferrite core 11 remains in it, and the writing end of ink cartridge 18 extends a distance 39 beyond the left end of the exposed cartridge support 19. A user then can easily grasp the exposed portion of ink cartridge 18 shown in FIG. 3, pull it to the left so that it slides out of switch assembly 26 and ink cartridge support 19, and replace it with a new ink cartridge. This avoids the above-described problems of the prior art.

FIG. 7 shows the structure of switch assembly 26 in the described embodiment of the invention. The right end of ink cartridge 18 slides in and out of a snugly fitting mating conductive cap 28, as indicated by arrows 34. Conductive cap 28 has a cylindrical body with an right end portion 28B that limits the amount of insertion of the right end of ink cartridge 18. Conductive cap 28 includes an integral annular conductive flange 28A. A first conductive contact ring 29 is attached to support structure 19 as shown in FIG. 2 and is attached by conductor 30 to appropriate terminals (not shown) on printed circuit board 22. A second conductive ring 31 also is supported in a fixed position by ink cartridge support 19, which is composed of insulative plastic material. Conductive ring 31 is connected by a conductor 32 to a suitable terminal of printed circuit board 22. A conductive compression spring 33 is disposed between the right surface of annular flange 28 of conductive cap 28 and the left surface of conductive ring 31, thereby urging ink cartridge to the left so that the left surface of conductive flange 28A abuts and electrically contacts the right surface of conductive ring 29, to thus form a normally closed electrical switch. When the writing tip 18A of ink cartridge 18 is pressed against a digitizing surface, spring 33 is compressed as ink cartridge 18 moves to the left, opening the electrical switch, and signaling the circuitry on printed circuited board 22 to begin operating and transmitting a signal to pen coil 12.

Thus, FIGS. 1–3 show a digitizer pen wherein if nose 16 is removed from barrel 17, the ferrite core 11 also is removed, leaving the coil 12 in the pen body 17, and leaving much more of the writing end of cartridge 18 exposed than for the prior art. The user can then easily grasp the exposed end of the ink cartridge 18 with his or her fingers, withdraw it, and replace it with a new one. When the removable nose 16 is returned to its original position, so is the ferrite core 11. This structure permits use of and easy replacement of standard inexpensive ball point pen ink cartridges in a low power digitizer pen that transmits a strong pen signal to the digitizer grid conductors.

Referring to FIGS. 4–6, an alternate embodiment of the invention is shown which is essentially identical to the embodiments of FIGS. 1–3 except that the ferrite core 11 consists of two separate sections 11A and 11B which abut each other when nose section 16 is affixed to barrel 17 as shown in FIG. 5. However, when nose section 16 is removed from barrel 17 as shown in FIG. 6 by dashed line 35, ferrite core section 11A is removed, while ferrite core section 11B with coil 12 wound thereon remains affixed to plastic support structure 19. In either case, the tip end of ink cartridge 18 extends beyond the left end portion of plastic support structure 19 by a distance 39, allowing easy removal of ink cartridge 18 by simply pulling it to the left, sliding it out of the conductive cap 28 of switch assembly 26.

Depending on the diameter of the ferrite core 11, the thickness of its wall, and the length of the recess 16B in nose section 16 and its stability as it is installed on barrel section 17, either of the embodiments shown herein might be preferable over the other. For example, the embodiment of FIGS. 1–3 might be more easily manufacturable, while the embodiment of FIGS. 4–6 might be less subject to breakage of ferrite core 11 as the nose section is installed on the barrel section.

While the invention has been described with reference to several particular embodiments thereof, those skilled in the art will be able to make the various modifications to the described embodiments of the invention without departing from the true spirit and scope of the invention. It is intended that all combinations of elements and steps which perform substantially the same function in substantially the same way to achieve the same result are within the scope of the invention. For example, the nose section 16 could be integral with barrel section 17 and the internal components, including the ink cartridge 18, support 19, coil 12, switch assembly 26, and circuit assembly 23, could be withdrawn out of the right end of barrel section 17 to replace a spent ink cartridge. The ferrite core 11 would remain in the nose section 16, and the writing end of ink cartridge 18 would still extend the distance 39 indicated in FIG. 6 beyond the support 19. Another variation on the disclosed invention would be to locate coil 12 permanently in the nose section 12 around the portion of ferrite core 11 attached therein, if suitable electrical contacts were to be provided to connect circuitry of printed circuit board 22 and integrated circuit 23 to the windings of coil 12 when the nose section 16 is attached to barrel section 17.

What is claimed is:

1. In a digitizer pen including a barrel section, a nose section adjacent to the barrel section, and an ink cartridge disposed in the barrel section and having a writing tip protruding from an end of the nose section, an improvement for solving the problem of difficulty in removing an ink cartridge from a digitizer pen of the type in which only a small writing tip portion of the ink cartridge extends from the nose section and in which high signal strength is achieved with low power dissipation by providing in the nose section a ferrite core having therein a hole through which the ink cartridge extends and providing a pen coil wound around the ferrite core, the improvement comprising:

(a) a ferrite core disposed in the nose section, at least a portion of the ferrite core being permanently disposed in the nose section;

(b) a coil including a plurality of turns around the ferrite core, the ink cartridge extending through a hole in the ferrite core;

(c) at least the portion of the ferrite core being separable from the ink cartridge to expose a sufficient length of a writing end portion of the ink cartridge to enable a user to easily grasp the exposed portion of the ink cartridge and remove it without the aid of a tool.

2. In a digitizer pen, the improvement of claim 1 wherein the nose section is removably attached to the barrel section, and at least the portion of the ferrite core is separable from the coil.

3. In a digitizer pen, the improvement of claim 2 wherein the coil is attached in fixed relation to the barrel section.

4. In a digitizer pen including a barrel section, a nose section removably attached to the barrel section, and an ink cartridge disposed in the barrel section and having a writing tip protruding from an end of the nose section, an improvement for solving the problem of difficulty in removing an ink cartridge from a digitizer pen of the type in which only a small writing tip portion of the ink cartridge extends from the nose section and in which high signal strength is achieved with low power dissipation by providing in the nose section a ferrite core having therein a hole through which the ink cartridge extends and providing a pen coil wound around the ferrite core, the improvement comprising:

(a) a ferrite core disposed in the nose section, a first portion of the ferrite core being rigidly attached to the nose section;

(b) a coil attached in fixed relation to the barrel section and including a plurality of turns around a second portion of the ferrite core, the ink cartridge extending through the first and second portions of the ferrite core;

(c) the first portion of the ferrite core being separable from the coil, so that when the nose section is removed from the barrel section the first portion of the ferrite core is separated from the coil, leaving the coil attached in fixed relation to the barrel section and also leaving exposed a sufficient portion of the ink cartridge initially covered by the first portion of the ferrite core to enable a user to easily grasp the exposed portion of the ink cartridge and remove it without the aid of a tool.

5. In a digitizer pen, the improvement of claim 4 wherein the second portion of the ferrite core is integral with the first portion thereof and also is separable from the coil.

6. In a digitizer pen, the improvement of claim 4 wherein the first portion of the ferrite core is separable from the second portion thereof.

7. In a digitizer pen, the improvement of claim 4 wherein the second portion of the ferrite core is attached to the barrel section and remains in fixed relation to the coil when the nose section is removed from the barrel section.

8. In a digitizer pen, the improvement of claim 7 wherein the ferrite core is cylindrical.

9. A cordless digitizer pen, comprising in combination:

(a) a barrel section and a nose section adjacent to the barrel section;

(b) an ink cartridge disposed in the barrel section and having a writing tip protruding from an end of the nose section;

(c) a ferrite core disposed in the nose section, at least a portion of the ferrite core being permanently disposed in the nose section;

(d) a coil including a plurality of turns around the ferrite core with terminals coupled to a circuit assembly in the barrel section, the ink cartridge extending through a hole in the ferrite core; and (e) at least the portion of the ferrite core being separable from the ink cartridge to expose a sufficient length of a writing end portion of the ink cartridge to enable a user to easily grasp the exposed portion of the ink cartridge and remove it without the aid of a tool.

10. The cordless digitizer pen of claim 9 wherein the nose section is removably attached to the barrel section, and at least the portion of the ferrite core is separable from the coil.

11. The cordless digitizer pen of claim 10 wherein the coil is attached in fixed relation to the barrel section.

12. A cordless digitizer pen comprising in combination:

(a) a barrel section;

(b) a nose section removably attached to the barrel section;

(c) an ink cartridge disposed in the barrel section and having a writing tip protruding from an end of the nose section;

(d) a ferrite core disposed in the nose section, a first portion of the ferrite core being rigidly attached to the nose section;

(e) a coil attached in fixed relation to the barrel section and including a plurality of turns around a second portion of the ferrite core with terminals coupled to a circuit assembly in the barrel section, the ink cartridge extending through the first and second portions of the ferrite core;

(f) the first portion of the ferrite core being separable from the coil, so that when the nose section is removed from the barrel section the first portion of the ferrite core is separated from the coil, leaving the coil attached in fixed relation to the barrel section and also leaving exposed a sufficient portion of the ink cartridge initially covered by the first portion of the ferrite core to enable a user to easily grasp the exposed portion of the ink cartridge and remove it without the aid of a tool.

13. The cordless digitizer pen of claim 12 wherein the second portion of the ferrite core is integral with the first portion thereof and also is separable from the coil.

14. The cordless digitizer pen of claim 12 wherein the first portion of the ferrite core is separable from the second portion thereof.

15. The cordless digitizer pen of claim 12 wherein the second portion of the ferrite core is attached to the barrel section and remains in fixed relation to the coil when the nose section is removed from the barrel section.

16. The cordless digitizer pen of claim 15 wherein the ferrite core is cylindrical.

17. A method for solving the problem of difficulty in removing an ink cartridge from a digitizer pen of the type in which only a small writing tip portion of the ink cartridge extends from the nose section and in which high signal strength is achieved with low power dissipation by providing in the nose section a ferrite core having therein a hole through which the ink cartridge extends and providing a pen coil wound around the ferrite core, the method comprising the steps of:

(a) permanently attaching at least a portion of a ferrite core in the nose section, the ink cartridge extending through a hole in the ferrite core;

(b) providing a coil including a plurality of turns around the ferrite core;

(c) removing the nose section and at least the portion of the ferrite core from the ink cartridge to thereby expose a sufficient length of a writing end portion of the ink cartridge to enable a user to firmly grasp the writing end portion of the ink cartridge; and (d) grasping the exposed portion of the ink cartridge and removing it from the digitizer pen.

18. The method of claim 17 including performing step (d) without the aid of a tool.

* * * * *